United States Patent
Tiedemann, Jr. et al.

(10) Patent No.: US 7,466,741 B2
(45) Date of Patent: *Dec. 16, 2008

(54) METHOD AND APPARATUS FOR CONCURRENTLY PROCESSING MULTIPLE CALLS IN A SPREAD SPECTRUM COMMUNICATIONS SYSTEM

(75) Inventors: Edward G. Tiedemann, Jr., Concord, MA (US); Ragulan Sinnarajah, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/624,187

(22) Filed: Jan. 17, 2007

(65) Prior Publication Data

US 2007/0217597 A1   Sep. 20, 2007

Related U.S. Application Data

(63) Continuation of application No. 10/638,150, filed on Aug. 7, 2003, now Pat. No. 7,184,459, and a continuation of application No. 09/519,003, filed on Mar. 3, 2000, now Pat. No. 6,625,198.

(51) Int. Cl.
    *H04B 1/69* (2006.01)
(52) U.S. Cl. ........................ 375/130; 375/133
(58) Field of Classification Search ............. 375/130, 375/133, 135, 136, 141, 145, 147; 455/401, 455/423, 436, 442
    See application file for complete search history.

(56) References Cited

U.S. PATENT DOCUMENTS

| 4,901,307 | A | 2/1990 | Gilhousen et al. |
| 5,103,459 | A | 4/1992 | Gilhousen et al. |
| 5,487,175 | A | 1/1996 | Bayley et al. |

(Continued)

FOREIGN PATENT DOCUMENTS

JP    09-065425 A    3/2007

(Continued)

OTHER PUBLICATIONS

ISR:PCT/US00/22243, DOM: Dec. 27, 2000.

(Continued)

*Primary Examiner*—Emmanuel Bayard
(74) *Attorney, Agent, or Firm*—Ramin Mobarhan; François A. Pelaez; Thomas R. Rouse

(57) ABSTRACT

The call processing state machines defined by the CDMA standards (e.g., IS-95 and IS-2000) are modified to include a "traffic channel" substate indicative of the mobile station processing at least one active call. Call control (CC) state machines of various types are also provided to control the processing of the calls. To process one or more calls concurrently, a CC state machine is instantiated upon receiving an indication to process a particular call. The instantiated CC state machine is identified with, and used to control the processing of, the particular call. Upon receiving an indication to process an additional call, another CC state machine can be instantiated for the additional call. Each call to be processed can also be associated with a particular a service option connection, which includes information indicative of a set of parameters (e.g., the physical channels) to be used for data transmission.

9 Claims, 16 Drawing Sheets

U.S. PATENT DOCUMENTS

| | | | |
|---|---|---|---|
| 5,504,773 A | 4/1996 | Padovani et al. | |
| 5,638,412 A | 6/1997 | Blakeney et al. | |
| 5,710,768 A | 1/1998 | Ziv et al. | |
| 5,757,792 A | 5/1998 | Aoki | |
| 5,878,354 A | 3/1999 | Hasegawa | |
| 5,892,758 A | 4/1999 | Argyroudis | |
| 5,923,650 A | 7/1999 | Chen et al. | |
| 5,954,799 A | 9/1999 | Goheen et al. | |
| 5,983,099 A | 11/1999 | Yao et al. | |
| 6,041,109 A * | 3/2000 | Cardy et al. | 379/201.01 |
| 6,081,715 A * | 6/2000 | La Porta et al. | 455/445 |
| 6,085,079 A | 7/2000 | Tabeta | |
| 6,088,345 A | 7/2000 | Sakoda | |
| 6,111,893 A | 8/2000 | Volftsun et al. | |
| 6,122,356 A | 9/2000 | James | |
| 6,122,516 A | 9/2000 | Thompson et al. | |
| 6,125,275 A | 9/2000 | Comer et al. | |
| 6,134,435 A | 10/2000 | Zicker et al. | |
| 6,151,390 A | 11/2000 | Volftsun et al. | |
| 6,260,186 B1 | 7/2001 | James | |
| 6,282,202 B1 | 8/2001 | Mainwaring et al. | |
| 6,285,877 B1 | 9/2001 | Liu et al. | |
| 6,333,931 B1 | 12/2001 | Lapier et al. | |
| 6,393,481 B1 | 5/2002 | Deo et al. | |
| 6,574,211 B2 | 6/2003 | Padovani et al. | |
| 6,967,972 B1 | 11/2005 | Volftsun et al. | |

FOREIGN PATENT DOCUMENTS

| | | |
|---|---|---|
| WO | 95010912 | 4/1995 |
| WO | 95014358 | 5/1995 |

OTHER PUBLICATIONS

Steve Dennett: "The CDMA 2000 ITU-R RTT Candidate Submission (0.18)" Telecommunications Industry Associaton (TIA), Jul. 27, 1988, XP002155233 p. 20, line 14-35; p. 119, figure 56; p. 121; figure 57.

"TR45 Upper Layer (Layer 3) signaling standard for CDMA2000 spread spectrum systems," PN-4431, Jul. 1999.

* cited by examiner

METHOD AND APPARATUS FOR CONCURRENTLY PROCESSING MULTIPLE CALLS IN A SPREAD SPECTRUM COMMUNICATIONS SYSTEM

CLAIM OF PRIORITY UNDER 35 U.S.C. § 120

The present Application for patent is a Continuation and claims priority to U.S. Pat. No. 7,184,459 entitled "Method and Apparatus for Concurrently Processing Multiple Calls in a Spread Spectrum Communications System" issued Feb. 27, 2007, which is a continuation which claims priority to patent application Ser. No. 09/519,003 entitled "Method and Apparatus for Concurrently Processing Multiple Calls in a Spread Spectrum Communications System" filed Mar. 3, 2000, now issued as U.S. Pat. No. 6,625,198, and assigned to the assignee hereof and hereby expressly incorporated by reference herein.

BACKGROUND OF THE INVENTION

I. Field of the Invention

The present invention relates to wireless communication. More particularly, the present invention relates to method and apparatus for concurrently processing multiple calls in a spread spectrum communications system.

II. Description of the Related Art

The use of code division multiple access (CDMA) modulation techniques is one of several techniques for facilitating communication in which a large number of system users are present. Although other multiple access communication system techniques are known in the art, such as time division multiple access (e.g., TDMA and GSM), frequency division multiple access (FDMA), and AM modulation schemes such as amplitude companded single sideband (ACSSB), the spread spectrum modulation technique of CDMA has significant advantages over these other modulation techniques for multiple access communications systems. The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990, and U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992, both assigned to the assignee of the present invention and incorporated herein by reference.

CDMA systems are typically designed to conform to one or more particular CDMA standards. Examples of such CDMA standards include the "TIA/EIA/IS-95-A Mobile Station-Base Station Compatibility Standard for Dual-Mode Wideband Spread Spectrum Cellular System," "TIA/EIA/IS-95-B Mobile Station-Base Station Compatibility Standard for Dual-Mode Wideband Spread Spectrum Cellular System" (collectively, the IS-95 standard), the TIA/EIA/IS-98-A, -B, and -C standards entitled "Recommended Minimum Performance Standard for Dual-Mode Spread Spectrum Cellular and PCS Mobile Stations," and "The cdma2000 standards for spread spectrum systems," (hereinafter, the IS-2000 standard). New standards are continually proposed and adopted for use.

Each of the standards noted above defines a mechanism for processing a single call between a mobile station and a base station. The mechanism is characterized by a call processing state machine on the signaling layer (i.e., layer-3) that includes a number of states and a set of allowed transitions between the states. Each state in the state machine corresponds to a particular state of the mobile station (or base station) with respect to the call being processed. A transition to a new state takes place upon the occurrence of certain specified events.

CDMA systems are originally designed to (primarily) provide voice communication. Consequently, the call processing state machine defined by the CDMA standards is designed to support a single call, which is typically a voice call. For systems that conform to a particular CDMA standard and designed to implement the call processing state machine defined by that standard, only one call can typically be processed at any given moment, and a new call cannot be processed until the active call is terminated. This one-call limitation restricts the type of services that can be provided to the user.

As modern day communication evolves, it is highly desirable to provide enhanced communications services beyond just voice-only or data-only communication. These enhanced services often rely on the ability of the system to concurrently support multiple calls. For example, the ability to concurrently transmit voice and video (e.g., via two concurrent calls) can be used to provide video conferencing. For some applications, it is desirable to allow for concurrent transmission of voice and data (e.g., transfer of a file while carrying on a conversation).

Thus, techniques that allow for the concurrent processing of multiple calls in a spread spectrum environment are highly desirable.

SUMMARY OF THE INVENTION

The present invention provides techniques that enable the processing of multiple calls in a spread spectrum communications system. The invention achieves this by modifying (or redefining) the call processing state machine defined by the CDMA standards (e.g., IS-95 and IS-2000) to include a ("traffic channel") substate indicative of the mobile station processing at least one active call. The invention further provides call control (CC) state machines of various types, which are used to control the processing of the associated calls. In an embodiment, one CC state machine is instantiated for each call to be processed, and the instantiated CC state machine is terminated upon the release of the associated call. Referring to FIG. 5, Layer 3 processing state machine refers to the overall state machine 500, and call control (CC) state machines refer to the voice, data, ISDN, and GSM state machine instantiated for each call.

An embodiment of the invention provides a method for processing one or more calls concurrently in a spread spectrum communications system. In accordance with the method, an indication of a particular call to be processed is received and a CC state machine for this call is instantiated. The instantiated CC state machine is identified with and used to control the processing of the particular call. Thereafter, one or more data transmissions related to the particular call are exchanged. Upon receiving an indication of an additional call to be processed, another CC state machine can be instantiated for the additional call. Correspondingly, upon receiving a directive to release a particular call, the call is released and its instantiated CC state machine is terminated. In an embodiment, each call to be processed is associated with a particular service option connection, which includes information indicative of a set of parameters (e.g., the physical channels) to be used for data transmission.

The instantiated CC state machine can be of a particular type selected based on the type of the call being processed.

For example, different CC state machines can be used for voice, data, video, fax, ISDN, GSM, and other types of call. In one implementation, the instantiated CC state machine for a voice call includes: (1) a waiting for order substate indicative of a wait for an order from the base station, (2) a waiting for answer substate indicative of a wait for a user response to the particular call, (3) a conversation substate indicative of a period of permissible transmissions for the voice call, and (4) a release substate indicative of termination of the voice call.

Another embodiment of the invention provides a method for supporting two or more calls concurrently in a spread spectrum communications system. In accordance with this method, an indication of a first call ($Call_A$) to be processed is received. A first service option connection ($SO\ Conn_1$) to be used for data transmissions is determined, and a set of one or more physical channels is associated with the service option connection. The first call is mapped to the first service option connection, and a CC state machine is instantiated to control the processing of the first call. For each subsequent call to be processed, a separate CC state machine can be instantiated. Upon receiving a directive to release a particular call, the call is released and the instantiated CC state machine for that call is also terminated.

For the embodiments described above, when multiple, concurrent calls are being processed, one or more additional service option connections to be used for data transmission can be determined. Each active call is mapped to one of the service option connections. When a call is released, a determination is made as to whether the service option connection of the just released call is used by at least one active call. The service option connection is released if it is not used by at least one active call. Similarly, when a service option connection is released, a determination is made as to whether the physical channel(s) associated with the released service option connection are used by another service option connection. A physical channel is released if it is not used by at least one active service option connection.

Yet another embodiment of the invention provides a method for processing one or more calls in a spread spectrum communications system. In accordance with the method, a particular communications system is selected for use and a paging channel is monitored for an alert message of an incoming call. For each of the calls being processed, one or more physical channels are established for data transmission and a CC state machine is instantiated. Messages are then exchanged for the calls over the established physical channels. An indication to release a particular call is received and the instantiated CC state machine for the particular call is released in response to the received indication. Yet another embodiment of the invention provides a mobile unit that includes a controller coupled to a receiver unit and a transmitter unit. The receiver unit receives incoming messages and the transmitter unit transmits outgoing messages. The controller receives an indication of a particular call to be processed, instantiates a call control state machine for the particular call, and exchanges one or more messages related to the particular call via the receiver and transmitter units. The instantiated call control state machine is identified with, and used to control processing of, the particular call. The controller can further receive an indication of an additional call to be processed and can instantiate an additional call control state machine for the additional call. The controller can also receive a directive to release the particular call and thereafter releases the call control state machine for the particular call.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
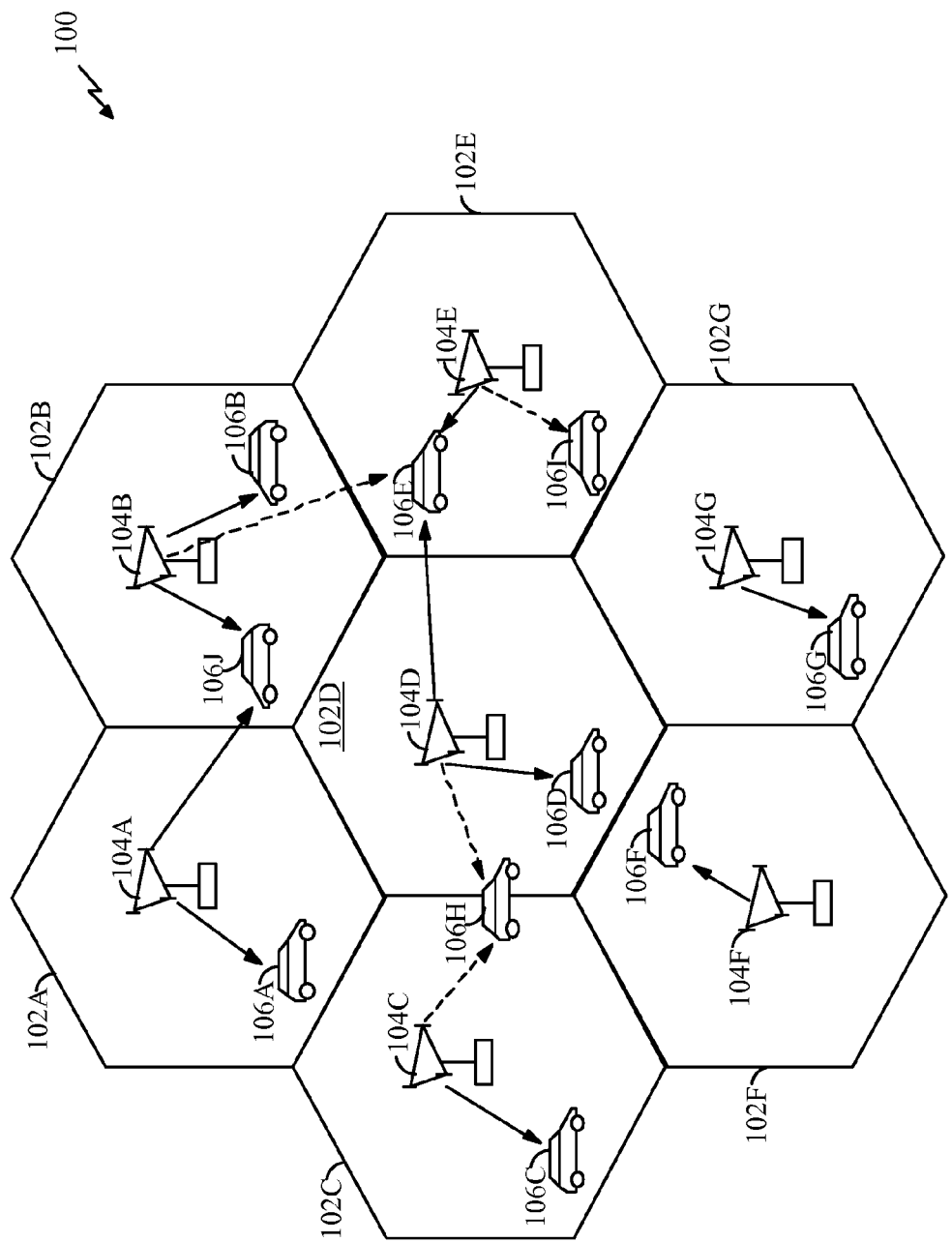
FIG. 1 shows a diagram of a spread spectrum communications system that supports a number of users.

FIG. 1 shows a diagram of a spread spectrum communications system 100 that support a number of users. System 100 provides communication for a number of cells 102a through 102g, with each cell 102 being serviced by a corresponding base station 104. Various mobile stations 106 are dispersed throughout the system. In an embodiment, each mobile station 106 communicates with one or more base stations 104 on the forward and reverse links at any given moment, depending on whether the mobile station is in soft handoff. The forward link refers to transmission from the base station to the mobile station and the reverse link refers to transmission from the mobile station to the base station. As shown in FIG. 1, base station 104a transmits data to mobile stations 106a and 106j on the forward link, base station 104b transmits data to mobile stations 106b and 106j, base station 104c transmits data to mobile station 106c, and so on. In FIG. 1, the solid line with the arrow indicates a data transmission from the base station to the mobile station. A broken line with the arrow indicates that the mobile station is receiving the pilot signal, but no data transmission, from the base station. The reverse link communication is not shown in FIG. 1 for simplicity.

As shown by FIG. 1, each mobile station, especially those located near a cell boundary, can receive data transmissions and/or pilot signals from multiple base stations. If the measured pilot signal from a particular base station is above a particular signal level, the mobile station can request that base station be added to the active set of the mobile station. In an embodiment, each mobile station can receive data transmission from zero or more member of the active set.

Figure 2:
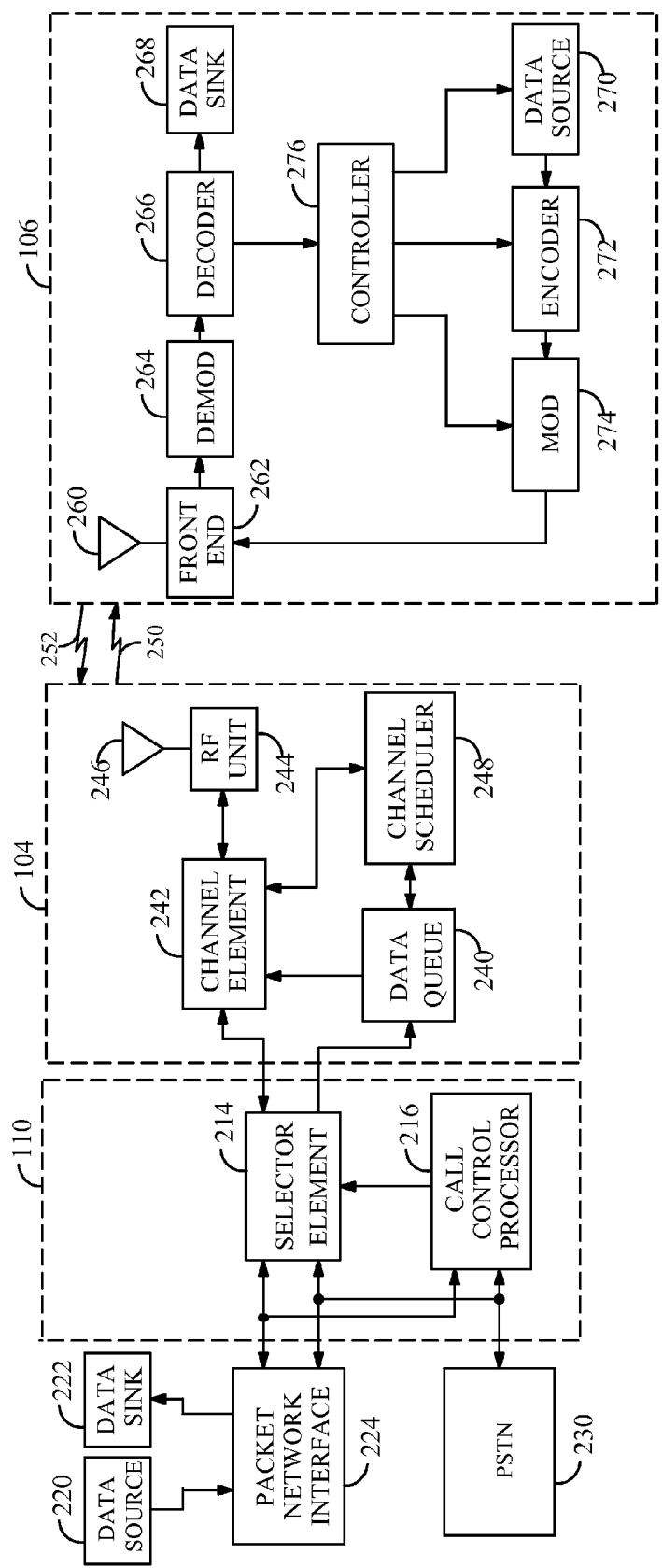
FIG. 2 shows a block diagram of an embodiment of the basic subsystems of system.

FIG. 2 shows a block diagram of an embodiment of the basic subsystems of system 100. A mobile switching center (MSC) 110 interfaces with a packet network interface 224, a PSTN 230, and base stations 104 in the system (only one base station 104 is shown in FIG. 2 for simplicity). Mobile switching center 110 coordinates the communication between mobile stations 106 in system 100 and other users coupled to packet network interface 224 and PSTN 230. PSTN 230 interfaces with users through the standard telephone network (not shown in FIG. 2).

Mobile switching center 110 includes many selector elements 214, although only one is shown in FIG. 2 for simplicity. One selector element 214 is assigned to control the communication between one or more base stations 104 and one mobile station 106. If a selector element has not been assigned to mobile station 106, a call control processor 216 is informed of the need to page mobile station 106. Call control processor 216 then directs base station 104 to page mobile station 106.

Data source 220 contains the data to be transmitted to mobile station 106. Data source 220 provides the data to packet network interface 224, which receives and routes the data to selector element 214. Selector element 214 then sends the data to each base station 104 in communication with mobile station 106. Each base station 104 maintains a data queue 240 that contains the data to be transmitted to mobile station 106.

In an embodiment, on the forward link, the data is partitioned into packets that are then formatted with other control and coding bits and subsequently encoded. Depending on the particular physical layer implementation of the CDMA system, the encoded packet may be demultiplexed into parallel streams and transmitted over one or more Walsh channels.

The data is sent, in packets, from data queue 240 to a channel element 242. For each packet, channel element 242 inserts the necessary control fields. The data packet, control fields, check bits, and code tail bits comprise a formatted packet. Channel element 242 then encodes one or more formatted packets and interleaves (or reorders) the symbols within the encoded packets. The interleaved packet is scrambled with a scrambling sequence, covered with Walsh covers, and spread with a long PN code and short PNI and PNQ codes. The spread data is quadrature modulated, filtered, and amplified by a transmitter within a RF unit 244. The forward link signal is sent through an antenna 246 and transmitted over the air on a forward link 250. A channel scheduler 248 located within base station 104 coordinates the communication between mobile station 106 and one or more base stations 104.

At mobile station 106, the forward link signal is received by an antenna 260 and routed to a receiver unit within a front end 262. The receiver unit filters, amplifies, quadrature demodulates, and quantizes the signal. The digitized signal is provided to a demodulator (DEMOD) 264 where it is despread with the long PN code and the short PNI and PNQ codes, decovered with the Walsh covers, and descrambled with the identical scrambling sequence. The demodulated data is provided to a decoder 266 that performs the inverse of the signal processing functions performed at base station 104 (e.g., the de-interleaving, decoding, and frame check functions). The decoded data is provided to a data sink 268. The hardware, as described above, supports transmissions of data, messaging, voice, video, and other types of communication over the forward link. These various types of communication are generically referred to herein as simply "data".

System 100 supports data transmissions on the reverse link from mobile station 106 to base station 104. Within mobile station 106, a controller 276 processes the data to be transmitted by routing the data to an encoder 272. Controller 276 can be implemented as a microcontroller, a microprocessor, a digital signal processing (DSP) chip, or an ASIC configured to perform the functions described herein.

In an embodiment, encoder 272 encodes the data in accordance with a Blank and Burst signaling data format described in U.S. Pat. No. 5,504,773, entitled "METHOD AND APPARATUS FOR THE FORMATTING OF DATA FOR TRANSMISSION," assigned to the assignee of the present invention, and incorporated herein by reference. Encoder 272 then generates and appends a set of CRC bits, appends a set of code tail bits, encodes the data and appended bits, and reorders the symbols within the encoded data. The interleaved data is provided to a modulator (MOD) 274.

Modulator 274 can be implemented in many embodiments. In an embodiment, the interleaved data is covered with Walsh codes, spread with a long PN code, and further spread with the short PNI and PNQ codes. The spread data is provided to a transmitter unit within a front end 262. The transmitter unit modulates the data, performs filtering and amplification, and transmits the reverse link signal through antenna 246 over the air on reverse link 252.

At base station 104, the reverse link signal is received by antenna 246 and provided to RF unit 244. RF unit 244 filters, amplifies, demodulates, and quantizes the received signal and provides the digitized signal to channel element 242. Channel element 242 despreads the digitized signal with the short PNI and PNQ codes and the long PN code, and decovers the despread data with the proper Walsh code. Channel element 242 then reorders the decovered data, decodes the de-interleaved data, and performs the CRC check function. The decoded data (e.g. the voice, video, data, or message) is provided to selector element 214 that then routes the data to the appropriate destination. Channel element 242 may also forward a quality indicator to selector element 214 indicative of the condition of the received data packet.

The physical layer used to process data for an IS-95 compliant CDMA system is described in further detail in the aforementioned U.S. Pat. No. 5,103,459. The physical layer of another CDMA system is described in U.S. Pat. No. 6,574,211, entitled "METHOD AND APPARATUS FOR HIGH RATE PACKET DATA TRANSMISSION," filed Nov. 3, 1997, and incorporated herein by reference.

System 100 can be designed to conform to any CDMA standard currently in existence, or future standards to be adopted. Each standard defines a mechanism for processing calls with the mobile station.

Figure 3:
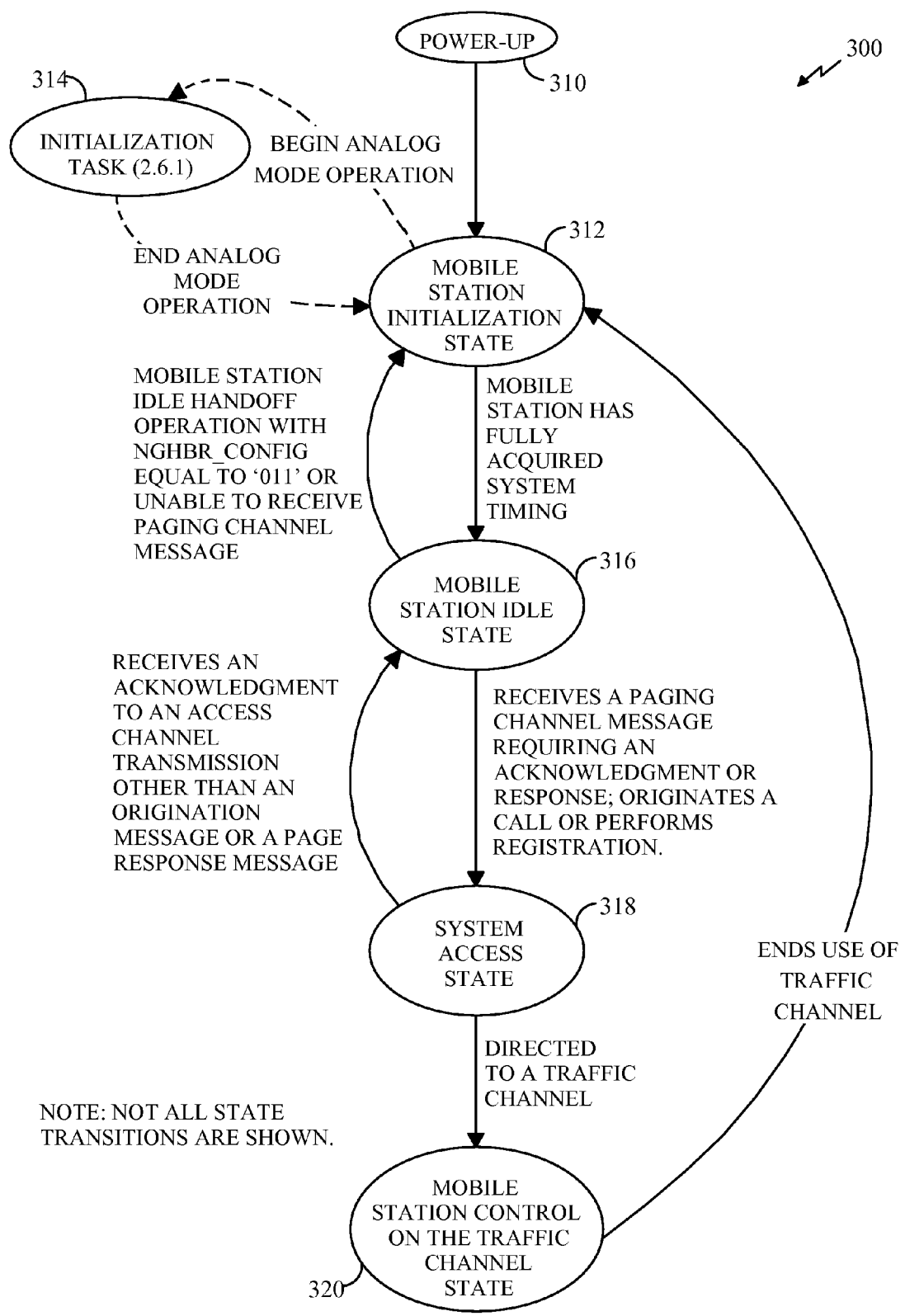
FIG. 3 shows a state machine for an embodiment of a mobile station call processing.

FIG. 3 shows a state machine 300 for an embodiment for mobile station call processing. This state machine is defined by the IS-95-A standard and a similar state machine is defined by the IS-2000 standard. Upon power-up, the mobile station transitions from a power-up state 310 to a mobile station initialization state 312.

In state 312, the mobile station selects a particular system to use. If the selected system is an analog system (e.g., a GSM or TDMA system), the mobile station transitions to a state 314 and begins analog mode operation. Otherwise, if the selected system is a CDMA system, the mobile station proceeds to acquire and synchronize to the selected CDMA system (i.e., to one or more base stations in the selected system). Once the mobile station has acquired the timing of the selected CDMA system, it enters a mobile station idle state 316.

In state 316, the mobile station is "on" but not active. The mobile station monitors a paging channel on the forward link for messages from the base station. If the mobile station is unable to receive the paging channel or if another base station is to be added to the active set (e.g., for soft handoff), the mobile station returns to state 312 and acquires the base station. In state 316, the mobile station can receive messages or an incoming call, originate a call, perform registration, initiate a message transmission, or perform some other actions. Upon initiating any of these actions, the mobile station transitions to a system access state 318.

In state 318, the mobile station sends messages to the base station on one or more access channels and receives messages from the base station on the paging channel in an attempt to access the base station. The exchange of messages is dependent on the particular type of communication (e.g., voice, data) between the mobile station and the base station and the originator of the message (i.e., the mobile station or base station), and is described in further detail below. Depending on the outcome of the message exchange, the mobile station can return to idle state 316 if no "active" communication is to be performed with the base station or proceed to a mobile station control on the traffic channel state 320 if a call with the base station is to be processed. Prior to the transition to state 320, the mobile station is assigned a forward traffic channel for the call.

In state 320, the mobile station communicates with the base station using the established forward and reverse traffic channels. Upon termination of the call, the mobile station returns to state 312.

The state machine shown in FIG. 3 is further described in the applicable CDMA standards (e.g., the IS-95 and IS-2000 standards). For a particular CDMA standard, each of the states shown in FIG. 3 is defined by a state machine that includes a number of substates.

Figure 4:
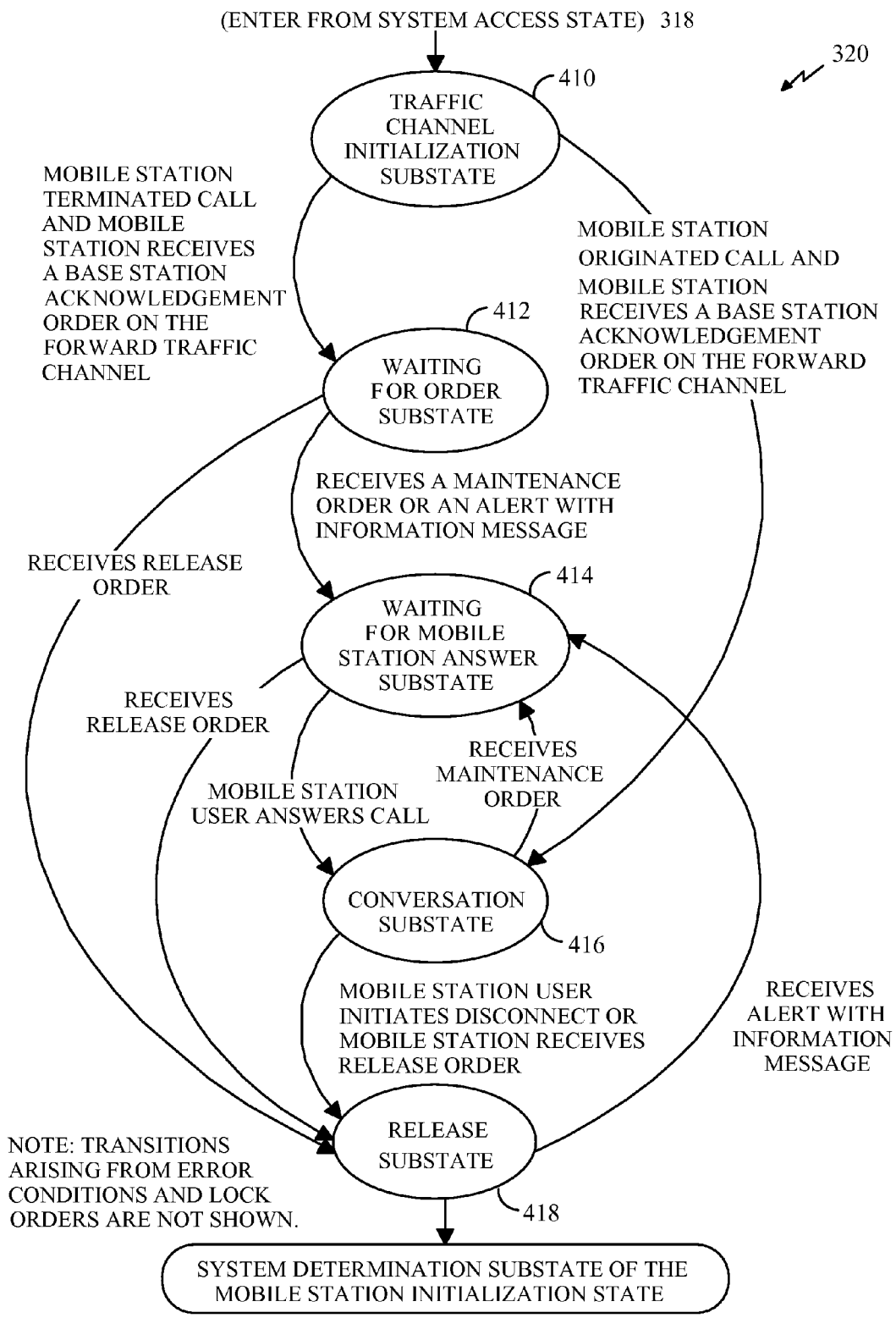
FIG. 4 shows a state machine for an embodiment of mobile station control on the traffic channel state.

FIG. 4 shows a state machine for an embodiment of mobile station control on the traffic channel state 320. From system access state 318, upon receiving the assigned forward traffic channel, the mobile station enters a traffic channel initialization substate 410 of state 320.

In substate 410, the mobile station verifies that it can receive data on the forward traffic channel, begins transmitting data on the reverse traffic channel, and synchronizes the traffic channels between the mobile station and the base station. The mobile station also performs a set of other functions (e.g., adjustment of the power control) upon entering and while in substate 410. The mobile station then waits for an indication from layer 2 (for an IS-2000 compliant system) or from the base station (for an IS-95 compliant system) that the forward traffic channel has been acquired. The mobile station then transitions to a waiting for order substate 412 if it received a call originated from the base station, or to a conversation substate 416 if it originated the call.

In substate 412, the mobile station waits for an Alert with Information Message from the base station. This message indicates how and when the mobile station should ring the phone. If the mobile station receives the message within a particular time period ($T_{51m}$) of entering substate 410, it transitions to a waiting for mobile station answer substate 414.

In substate 414, the mobile station informs the user of the incoming call by ringing the phone in accordance with the received Alert with Information Message. The mobile station then waits for a user response. Upon receiving the user response (e.g., an indication of a depression of the "answer" button), the mobile station transitions to conversation substate 416.

In substate 416, the mobile station communicates with the base station via the assigned traffic channels and in accordance with the negotiated service option connection, which is described in further detail below. For a data call or a call originated by the mobile station user, the user needs not be notified of the call and the mobile station enters substate 416 from substate 410. The mobile station stays in substate 416 for the duration of the call. The mobile station transitions to a release substate 418 if it receives a command from the user or a release order from the base station to release the call.

Substate 418 signifies the termination of the call with the base station and represents the end of mobile station control on the traffic channel state 320. In substate 418, the mobile station confirms the call disconnection. Upon confirmation, the mobile station returns to a system determination substate of mobile station initialization state 314.

The state machines shown in FIGS. 3 and 4 are described in further detail in the IS-95 and IS-2000 standards documents, including "TR45 Upper Layer (Layer 3) Signaling Standard for cdma2000 Spread Spectrum Systems," PN-4431, Jul. 11, 1999, which is incorporated herein by reference.

The state machine shown in FIG. 4 supports a single voice call between the mobile station and the base station. In particular, if the mobile station is in conversation substate 416 (e.g., during a voice or data call) and another call originated by the base station is received, the mobile station is not able to return to waiting for order substate 412 to inform the user of the newly received call. To return to substate 412, the current call would need to be terminated and the mobile station would need to return to mobile station initialization state 312. The single-call limitation generally prevents the CDMA system from offering a number of services such as video conferencing, multiple services (e.g., voice and video), and others.

Figure 5:
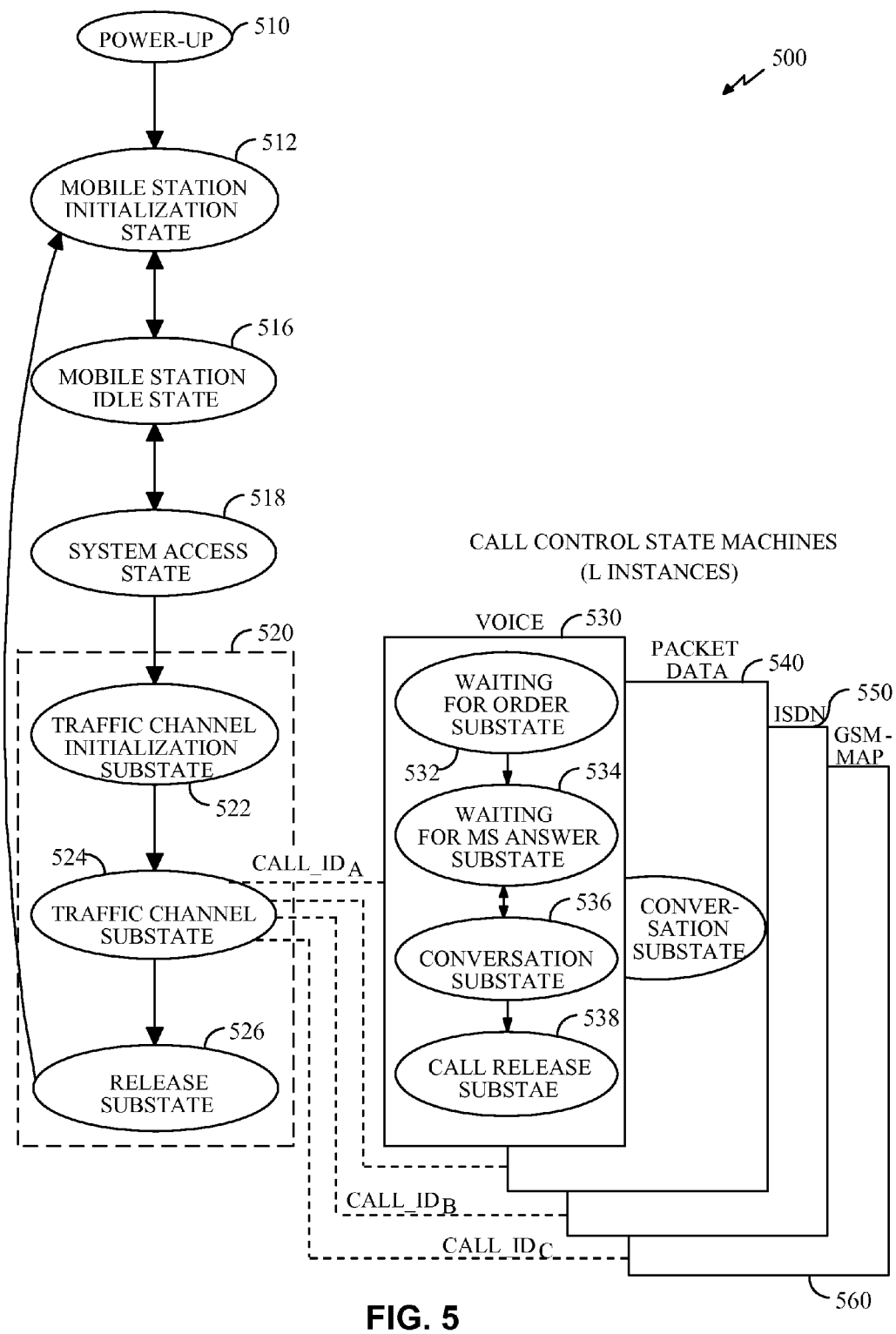
FIG. 5 shows a state machine for an embodiment of a mobile station call processing that can concurrently support multiple calls.

FIG. 5 shows a state machine 500 for an embodiment for mobile station call processing that can concurrently support multiple calls. State machine 500 shown in FIG. 5 can be used in place of state machine 300 shown in FIG. 3. State machine 500 includes a power-up state 510, a mobile station initialization substate 512, a mobile station idle state 516, and a system access state 518 that correspond to power-up state 310, mobile station initialization state 314, mobile station idle state 316, and system access state 318, respectively, in FIG. 3. However, mobile station control on the traffic channel state 320 is replaced with a traffic state 520 that includes a traffic channel initialization substate 522, a traffic channel substate 524, and a release substate 526.

In an embodiment, states 512, 516, and 518 are implemented similar to states 312, 316, and 318, respectively. In an embodiment, traffic channel initialization substate 522 and release substate 526 are implemented similar to that described for traffic channel initialization substate 410 and release substate 418, respectively, in FIG. 4.

Upon power up (state 510), the mobile station selects a particular system to use, and acquires and synchronizes to the selected system (state 512). The mobile station then monitors the paging channel on the forward link (state 516) for messages from the base station and can initiate one or more actions (e.g., receive messages or an incoming call, originates a call, performs registration, initiate a message transmission, and so on). Upon performing some of these actions, the mobile station sends messages to the base station on the access channel and receives messages from the base station on the paging channel (state 518) to establish a traffic channel for the communication. The mobile station then enters traffic state 520 and remains in this state while it has at least one pending call. Once all calls have been released, the mobile station returns to mobile station initialization state 512.

Upon entering traffic state 520 for the first call, the mobile station synchronizes to the assigned traffic channel (substate 522). The mobile station then transitions to traffic channel substate 524 and, upon receiving the appropriate message (e.g., a Call Setup Message), instantiates or invokes a call control (CC) state machine for the call. For example, the mobile station can instantiate a voice CC state machine 530 for a voice call, a data CC state machine 540 for a data call, an ISDN CC state machine 550 for a call with an ISDN network, a GSM CC state machine 560 for a call with a GSM network, or some other CC state machines for some other types of communication. The CC state machines are used to control the processing of the associated calls.

While in traffic state 520, if another call is originated or received, the mobile station instantiates another CC state machine for this new call. In an embodiment, one CC state machine is instantiated for each call being processed. The CC state machine is used to direct control of the associated call and to handle the call control messages related to that particular call. In this manner, a number of (L) CC state machines can exist at any given moment, where L=0, 1, 2, 3, and so on. The mobile station remains in traffic state 520 as long as there is at least one pending call. Upon termination of each call, the CC state machine for that call is released and the mobile station determines whether the released call is the last pending call. If the released call is the last call, the mobile station proceeds to release substate 526.

State machine 500 (comprising states 510, 512, 516, 518, and 520) can be used to implement a (lower) layer-3 state machine for a particular CDMA system. State machine 500 defines the interaction between the mobile station and the base station and is not specific to any particular call. State machine 500 can be used to concurrently support any number of calls. The CC state machines are call specific and can be implemented based on the system requirements. Moreover, CC state machines can be added, removed, or modified (independent of state machine 500) to provide different and/or additional services. The use of multiple CC state machines facilitates independent connection and release of calls.

Figure 6:
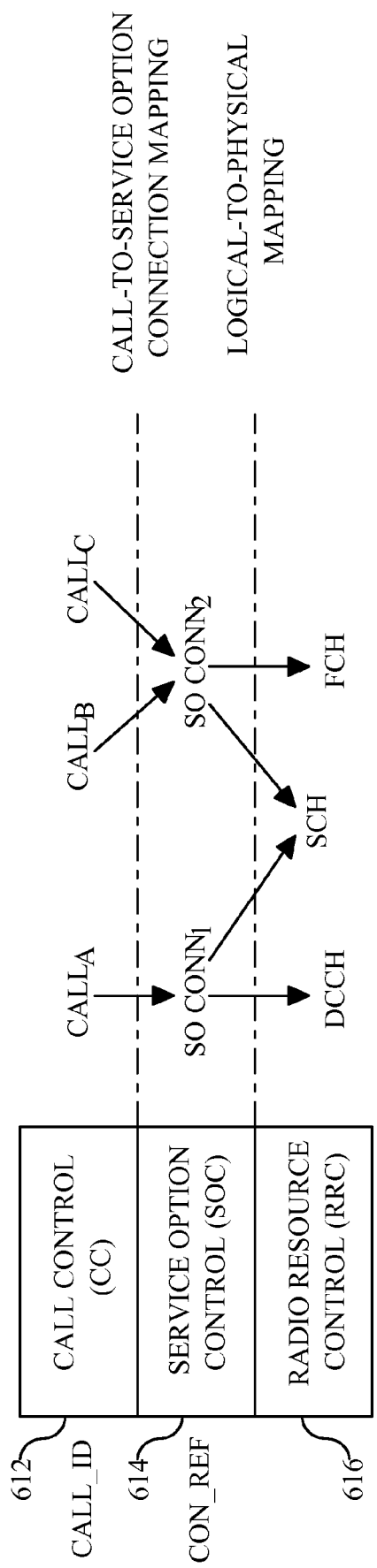
FIG. 6 is a diagram depicting the mapping between some of the sublayers of layer-3 in accordance with an aspect of the invention.

FIG. 6 is a diagram depicting the mapping between some of the sublayers of lower layer-3 in accordance with an aspect of the invention. As shown in FIG. 6, lower layer-3 includes a call control (CC) sublayer 612 that resides on top of a service option control (SOC) sublayer 614 that further resides on top of a radio resource control (RRC) sublayer 616. RRC sublayer 616 defines the physical traffic channels available for data transmissions. SOC sublayer 614 defines a set of parameters to be used for the data transmissions such as the multiplex options, the power control, the forward link traffic channel characteristics, and so on. Call control sublayer 612 identifies a set of pending calls being processed.

As shown in FIG. 6, a call ($Call_X$) is processed in CC sublayer 612 and mapped to a particular service option connection (SO $Conn_N$). In the example shown in FIG. 6, $Call_A$ is mapped to SO $Conn_1$, $Call_B$ is mapped to SO $Conn_2$, and $Call_C$ is also mapped to SO $Conn_2$. The subscripts A, B, and C represent the call identifiers (CALL_IDs) for the pending calls, and the subscripts 1 and 2 represent the connection references (CON_REFs) for the established service option connections.

Each service option connection identifies one or more physical channels to be used for data transmission. In the example shown in FIG. 6, SO $Conn_1$ is mapped to (i.e., utilizes) the dedicated control channel (DCCH) and the supplemental channel (SCH), and SO $Conn_2$ is mapped to the fundamental channel (FCH) and the supplemental channel (SCH).

As each call is connected, a new CC state machine (denoted as $Call_X$) is instantiated. The instantiated CC state machine is of a type selected based on the type of call being processed (e.g., voice, data, ISDN, GSM, and so on). Each CC state machine type includes a number of substates specific to that state machine type. The CDMA system can be designed to support a number of different CC state machine types, and additional CC state machine types for new call types (such as video and others) can be added as required or desired.

As indicated in FIG. 6, any number of calls can be concurrently processed. Moreover, one call or multiple calls can be mapped to each service option connection. The one-to-one mapping between call and service option connection can be used to implement voice communication in conformance with the IS-95 standard. In some instances, the reference for the service option connection (i.e., CON_REF) can also be used as the CALL_ID. In an embodiment, to support a many-to-one mapping between call and service option connection, a call-to-service option connection mapping is maintained by both the mobile station and the base station. When the last call mapped to a particular service option connection is released, that service option connection can also be released. Similarly, when the last service option connection mapped to a particular physical channel is released, that physical channel can be released.

The service option connection (SO $Conn_N$) defines a set of parameters to be used for data transmission (referred to as the service option SON) and is identified by a service option connection reference (CON_$REF_N$). In an embodiment, the service option connection is local to the mobile station and the base station.

The service option connection is negotiated via "service negotiation" procedures. In an embodiment, while the mobile station is in traffic state 520, if a service option connection is required to support a new call, the service option request and assignment are accomplished using the service negotiation procedures. An example of such procedures is outlined in the IS-2000 standard document. Other service negotiation procedures can also be implemented and are within the scope of the invention.

In some embodiments, the physical channels are established through the service negotiation. For these embodiments, the service negotiation procedures can be designed to include request for one or more new traffic channels and the exchange of channel configuration information. The required physical channels can then be connected and configured using the negotiated channel configuration information. Upon completion of the service option negotiation between the mobile station and the base station, the required physical channel(s) are established and ready for transmission.

In an embodiment, a number of different types of CC state machines are provided to support different types of call. Some example CC state machine types include:

Voice: The voice CC state machine type is provided for voice, circuit data, and some other services. Circuit data is transmitted via circuits (i.e., dedicated links) that are established for the connection, similar to a voice call. The signaling for circuit data is not in-band. The voice state machine can be implemented similar to that for an IS-95 call state machine (as shown in FIG. 4).

Packet data: The data CC state machine type can be provided for packet data. The implementation of this state machine can be based on the requirements of the particular CDMA system. In one embodiment, the data state machine can be implemented as a null CC state machine (i.e., no state machine) if the call control is performed via the data transmission.

ISDN: The ISDN CC state machine type can be provided for communication with an ISDN network.

GSM-MAP: The GSM-MAP CC state machine type can be provided for communication with a GSM-MAP network.

In the specific embodiment shown in FIG. 5, voice CC state machine 530 includes four substates: a waiting for order substate 532, a waiting for mobile station answer substate 534, a conversation substate 536, and a call release substate 538. Substates 532, 534, and 536 generally correspond to substates 412, 414, and 416, respectively, in FIG. 4. During termination of the voice call, the voice CC state machine transitions to the call release substate. Upon termination of the voice call, the CC state machine for this call is released.

In an embodiment, to facilitate the tracking of the calls and the processing of the instantiated CC state machines in a multiple, concurrent call environment, each call can be identified by a unique call identifier (CALL_D). In an embodiment, the CALL_ID is "local" to the mobile station <-> mobile switching center (MSC) path and is selected by the originator of the call. Implementing local CALL_ID allows the same CALL_ID to be used by multiple mobile stations concurrently. The CALL_ID can be analogized to the "Call Reference" in ISDN and the "Transaction Identifier" in GSM systems.

Once the CC state machine for a particular call has been established, subsequent call-specific transmissions (e.g., a Flash with Information Message) between the mobile station and the base station include the CALL_ID so that the transmissions can be routed to the proper CC state machine. In an embodiment, the CALL_ID can be implied for the (IS-95) voice CC state machine and for other CC state machines when there are no ambiguities. With this implementation, signaling in conformance with the IS-95 standard can be generated, and backward compatibility with existing IS-95 systems is maintained. When a single voice call or circuit switched data or fax call is running, only minimal changes, if any, may be required to add a (possibly optional) field to identify the type of the CC state machine (CC_Type) in the appropriate message. In some implementations, packet data calls may not require CALL_IDs since the signaling is in-band.

In an embodiment, the CC state machines are defined with the capability to support multiple calls per connection, similar to that of an ISDN network. The resources to support multiple calls per connection may be provided by the mobile switching center, and such processing may be transparent to the mobile station. For example, ISDN permits 3-way calls to have multiple call presence (CALL_IDs) at the mobile station. In this case, the mobile station explicitly handles the different call presence. However, in an ANSI-41 wireless systems, the mobile switching center handles the explicit call presence and the mobile station uses the Flash with Information Message to signal a change in 3-way call state to the mobile switching center. This mechanism for handling multiple calls per connection is further described in TIA/EIA-664, which is incorporated herein by reference.

The invention can be implemented, with slight modifications, within the framework of the call processing state machine currently defined by the IS-95 and IS-2000 standards. Referring back to FIGS. 3 and 4, upon entering mobile station control on the traffic channel state 320 from mobile station access state 318 (FIG. 3), the mobile station proceeds to traffic channel initialization substate 410, as currently performed by the IS-95 and IS-2000 standards. From traffic channel initialization substate 410, the mobile station enters a newly defined "traffic channel" substate. This new substate replaces waiting for order substate 412, waiting for mobile station answer substate 414, and conversation substate 416. One or more timers can be associated with substates 412 and 414 to provide the required time-out indicators implemented by the current CDMA standards.

Figure 7:
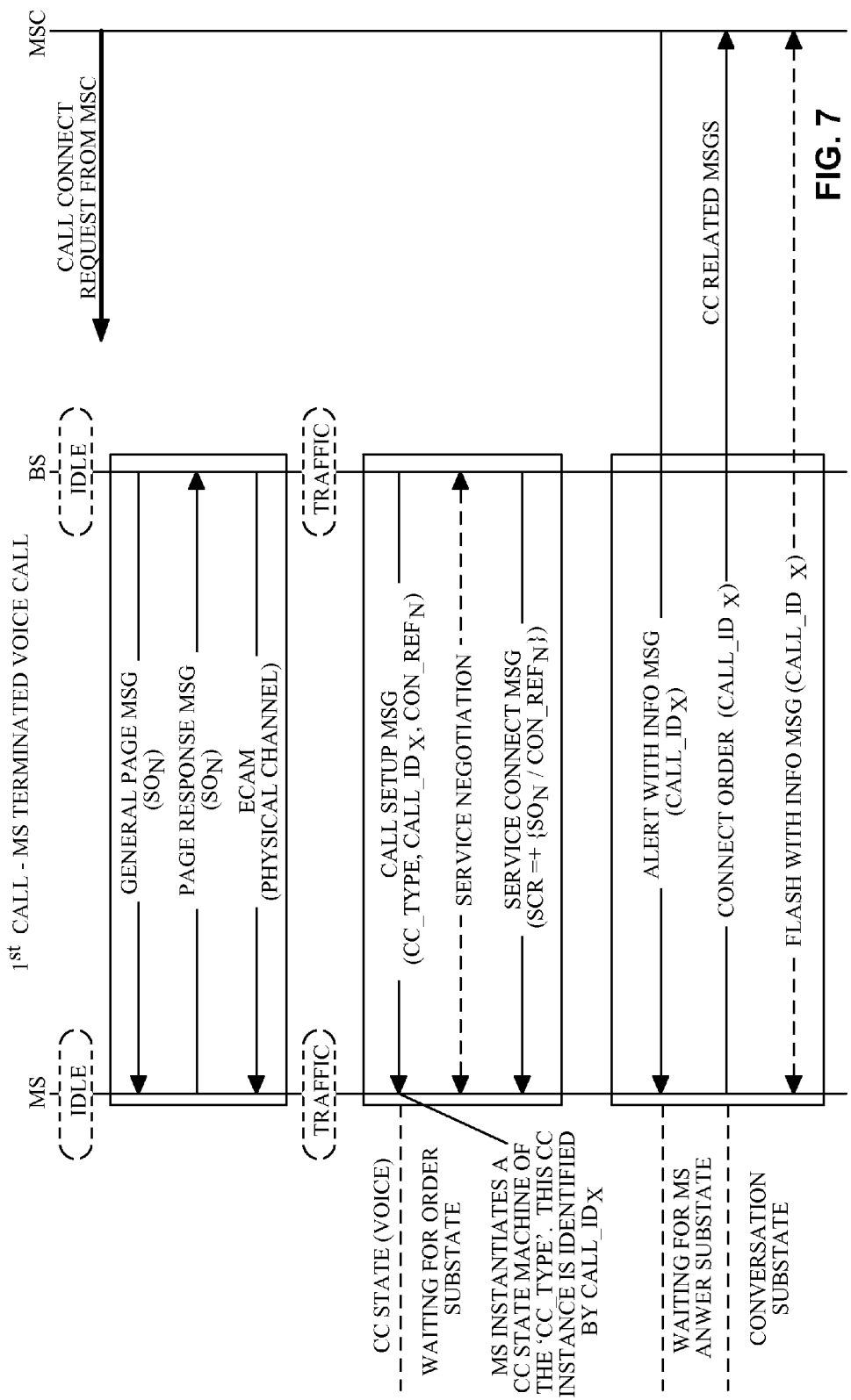
FIGS. 7 through 16 show diagrams of communication between the mobile station and the base station for establishing, processing, and releasing a call under various conditions.

FIG. 7 shows a diagram of the communication between the mobile station and the base station for processing a first call, which is a voice call received (i.e., terminated) by the mobile station. As used herein, a mobile station terminated call is a call originated from the mobile switching center and received by the mobile station. While in mobile station idle state 516, the mobile station receives from the paging channel a General Page Message that includes a new service option $SO_N$. The mobile station then enters system access state 518 and responds with a Page Response Message on the access channel. Thereafter, the mobile station receives an Extended Channel Assignment Message (ECAM) that includes the assigned physical channel. After receiving the ECAM, the mobile station transitions to traffic channel substate 524. While in substate 524, the mobile station receives a Call Setup Message, which includes a CC state machine type (CALL_Type), a call identifier (CALL_ID$_X$), and a service option connection for this call (CON_REF$_N$). For this specific example, the CC_Type is voice. Upon receiving the Call Setup Message, the mobile station instantiates a CC state machine 530 of the specified (voice) CC Type.

In waiting for order substate 532 of the instantiated voice CC state machine, the mobile station informs the user of the incoming call (e.g., by ringing the phone) and waits for a user response. In some system implementations, this Call Setup Message may be omitted for the first call (i.e., default values can be used for CALL_ID and CON_REF) and the CC_Type can be signaled via the ECAM. In this case, the CC state machine can be instantiated upon entering traffic channel substate 524.

The mobile station then executes the service negotiation procedures with the base station. In an embodiment, as part of the service negotiation procedures, the mobile station receives a Service Request Message with a service configuration record (SCR) that includes the newly added service option $SO_N$. A set of service negotiation messages is then exchanged between the mobile station and the base station in negotiating the parameters for the call, which may include the service option number. At the conclusion of the service negotiation, the mobile station receives a Service Connect Message that includes the SCR having the newly added service option $SO_N$ and the CON_REF$_N$ for the assigned service option connection.

In an embodiment, the service negotiation and the resulting establishment of the service option connection may occur prior to receiving the Call Setup Message. In this case, the CON_REF$_N$ in the Call Setup Message corresponds to the connection reference of the established service option connection.

Upon receiving an Alert with Information Message that includes the CALL_ID$_X$ assigned to this call, the mobile station transitions to waiting for mobile station answer substate 534. The mobile station then rings the phone and waits for a user response. After receiving the user response, the mobile station sends a Connect Order that includes the CALL_ID$_X$. The mobile station then transitions to conversation substate 536 and may exchange the Flash with Information Message with the base station. Data related to this call is transmitted via the established physical channel(s). As shown in FIG. 7, the CALL_ID is included with each call specific message such that the message can be properly routed and processed.

Figure 8:
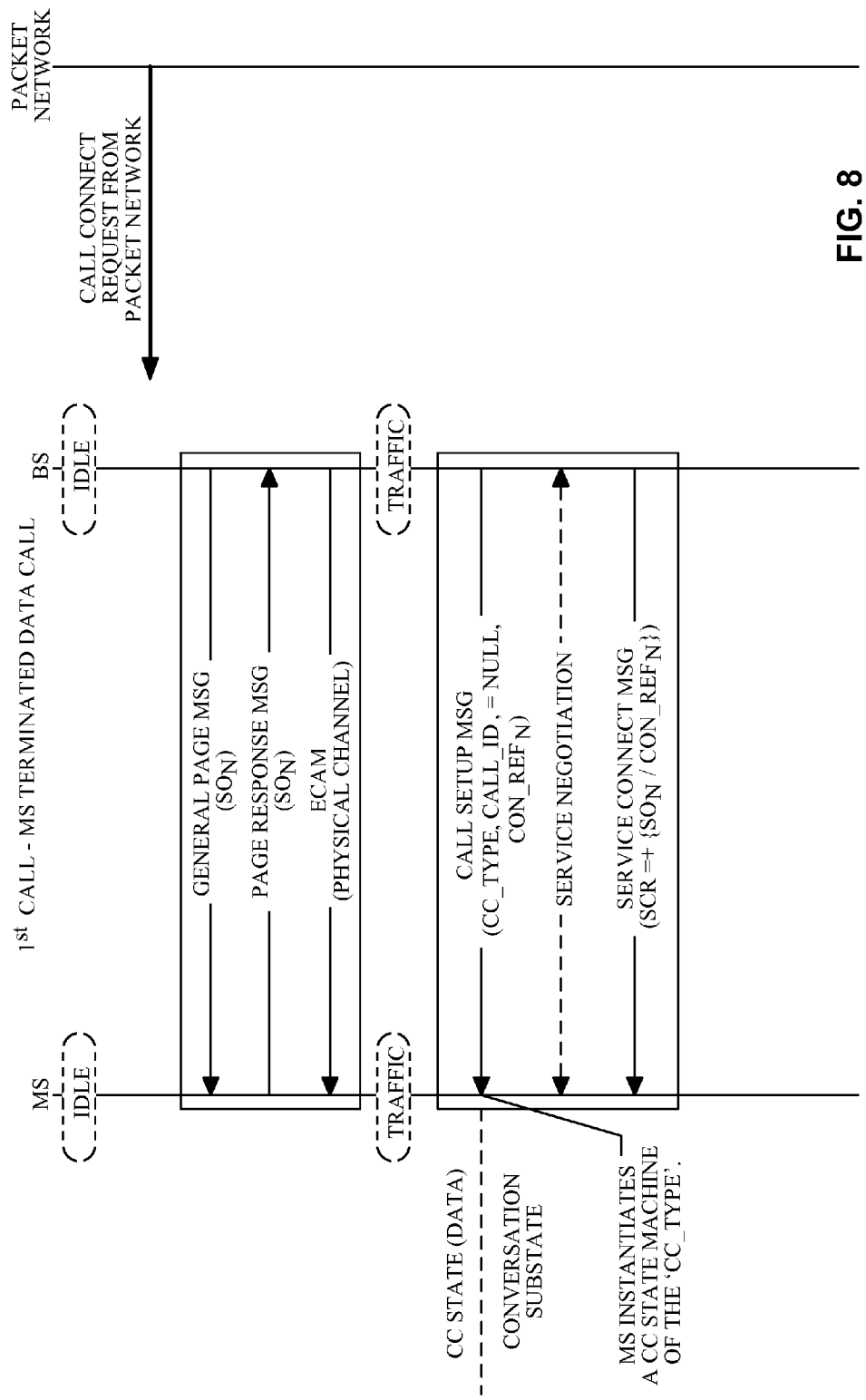

FIG. 8 shows a diagram of the communication between the mobile station and the base station for processing a first call, which is a data call received by the mobile station. The General Page Message, Page Response Message, and ECAM are exchanged and processed in similar manner as described above for FIG. 7. Upon receiving the ECAM, the mobile station transitions to the traffic channel substate. Upon receiving the Call Setup Message, the mobile station instantiates a CC state machine of the specified (data) CC_Type and the CC state machine is placed in the conversation substate. The mobile station also executes the service negotiation procedures with the base station in similar manner as that described above. Upon completion of the service negotiation, the mobile station receives data transmission from the base station via the assigned physical channel(s).

Figure 9:
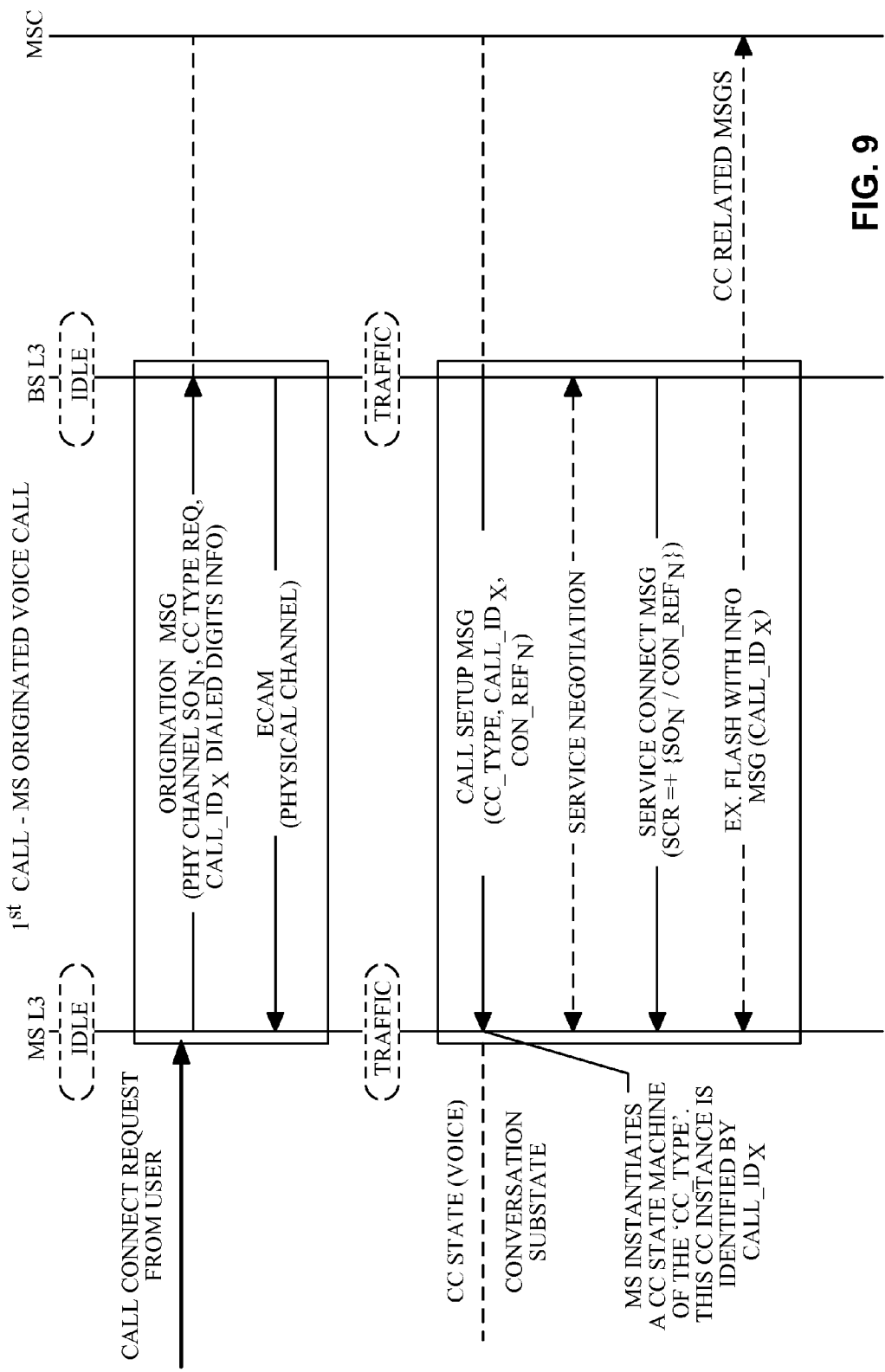

FIG. 9 shows a diagram of the communication between the mobile station and the base station for processing a first call, which is a voice call originated by the mobile station. While in mobile station idle state 516, the mobile station receives a call connect request from the user. In response, the mobile station sends an Origination Message that includes, for example, the physical channel, the new service option $SO_N$, a request for a particular type of CC state machine (CC Type Req), the $CALL\_ID_X$, and information on the dialed digits. The mobile station then receives an ECAM that includes the assigned physical channel.

Similar to FIG. 8, upon receiving the ECAM, the mobile station transitions to the traffic channel substate. Upon receiving the Call Setup Message, the mobile station instantiates a CC state machine of the specified (data) CC_Type and the CC state machine is placed in the conversation substate.

Figure 10:
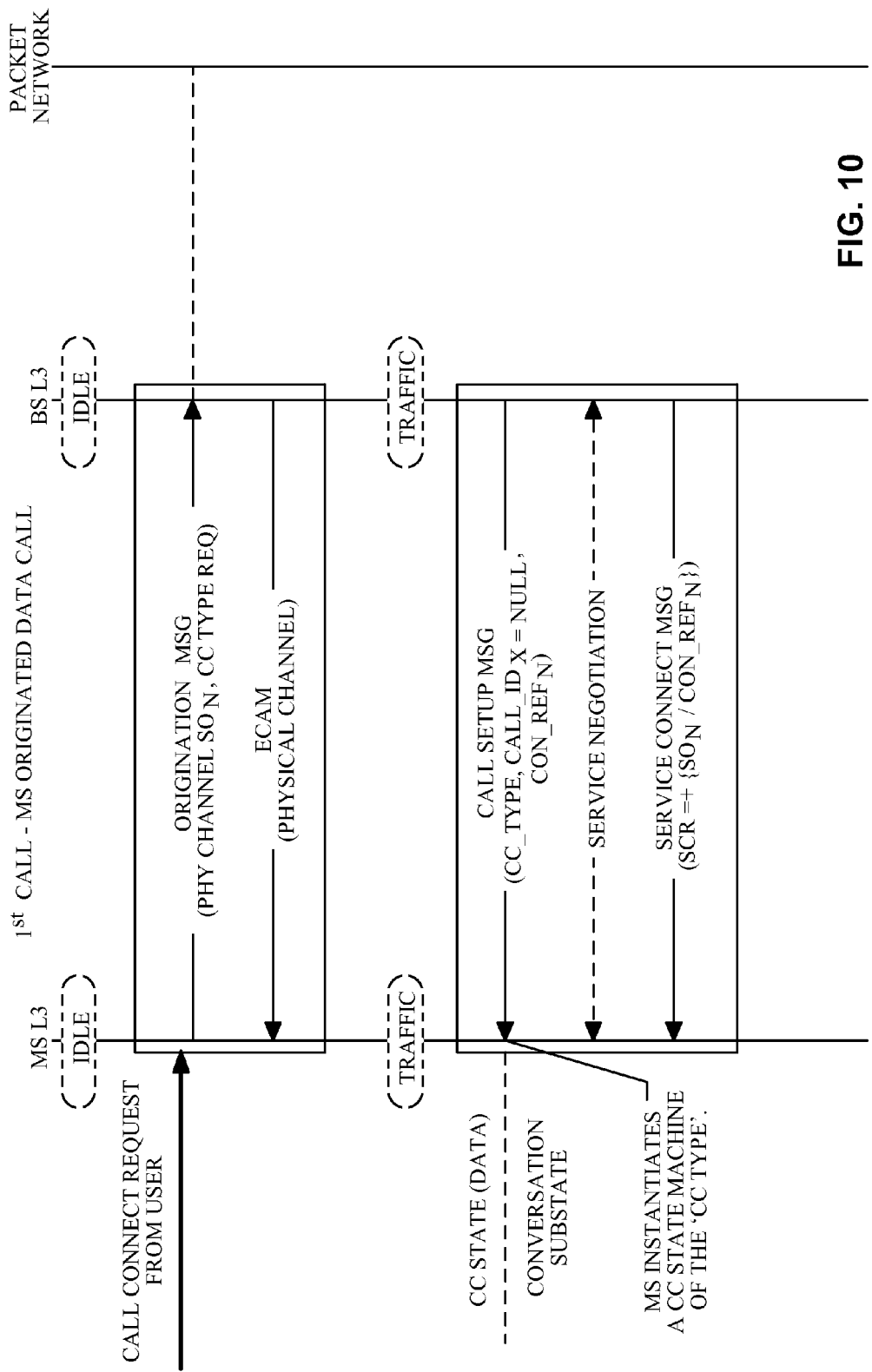

FIG. 10 shows a diagram of the communication between the mobile station and the base station for processing a first call, which is a data call originated by the mobile station. The diagram for the mobile station originated data call is similar to that for the mobile station originated voice call in FIG. 9, except that the mobile station instantiates a data CC state machine 540 after receiving the Call Setup Message. Upon completion of the service negotiation, the mobile station sends data via the assigned physical channel(s).

Figure 11:
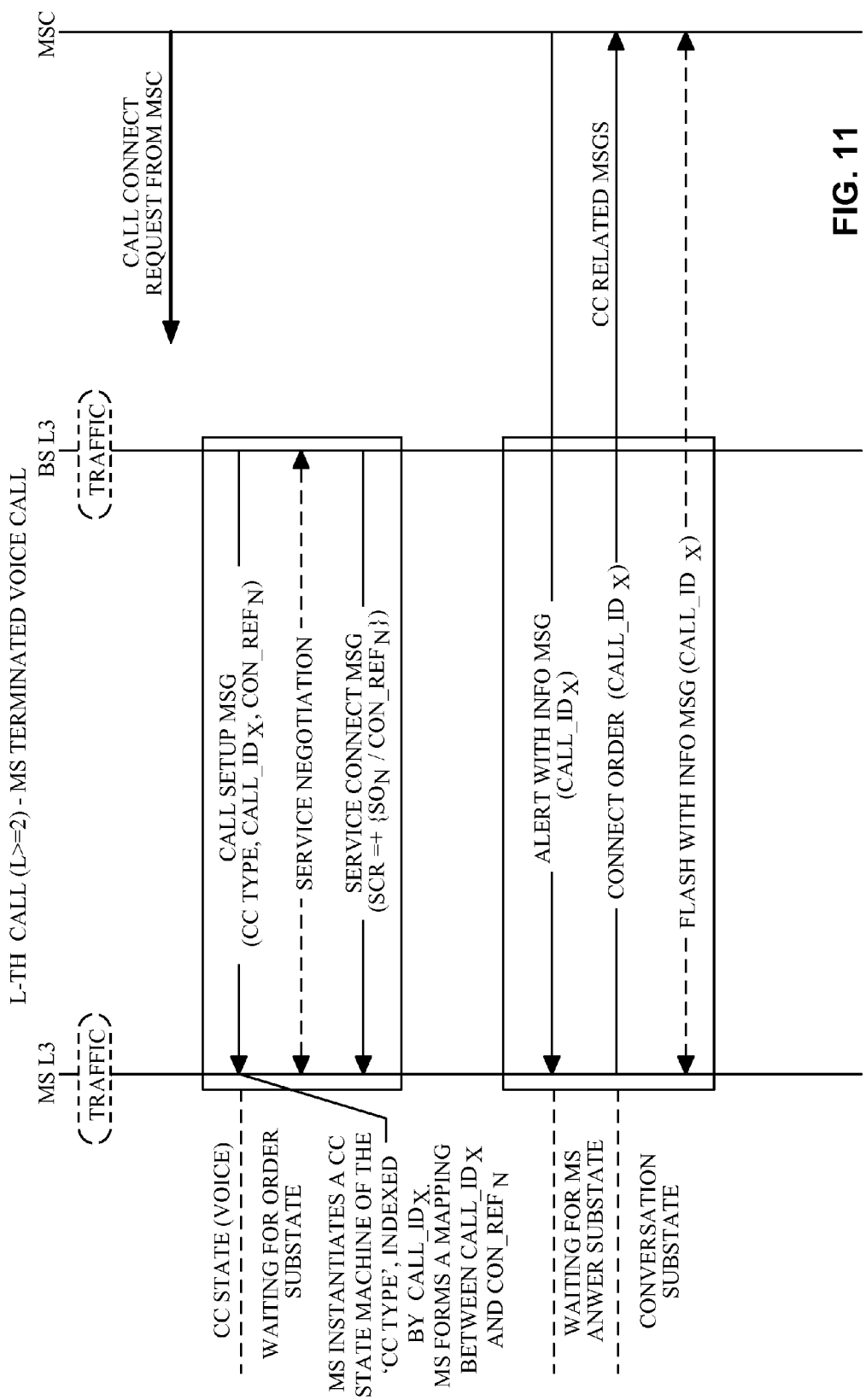

FIG. 11 shows a diagram of the communication between the mobile station and the base station for a subsequent (i.e., $L \geq 2$) call, which is a voice call received by the mobile station. The mobile switching center sends a call connect request and, in response, the base station sends a Call Setup Message that includes, for example, the CC Type, the $CALL\_ID_X$, and the $CON\_REF_N$. Upon receiving the Call Setup Message, the mobile station instantiates a CC state machine 530 of the specified (voice) CC Type and indexed by the specified $CALL\_ID_X$. The mobile station performs a mapping between the $CALL\_ID_X$ and the $CON\_REF_N$.

For this new voice call, the mobile station transitions to waiting for order substate 532 and can perform the service negotiation procedures. The mobile station receives a Service Request Message that includes the new service option $SO_N$ for this call. Upon completion of the service negotiation, the mobile station receives a Service Connect Message with the service configuration record that includes the assigned SON, $CON\_REF_N$, and other relevant parameters. The subsequent communication between the mobile station and the base station proceeds in similar manner as that described above in FIG. 7 for the first voice call. Messages to this voice call and other calls (with the possible exception of the first call) are identified by the CALL_ID assigned to the call. Data calls may use in-band signaling.

Figure 12:
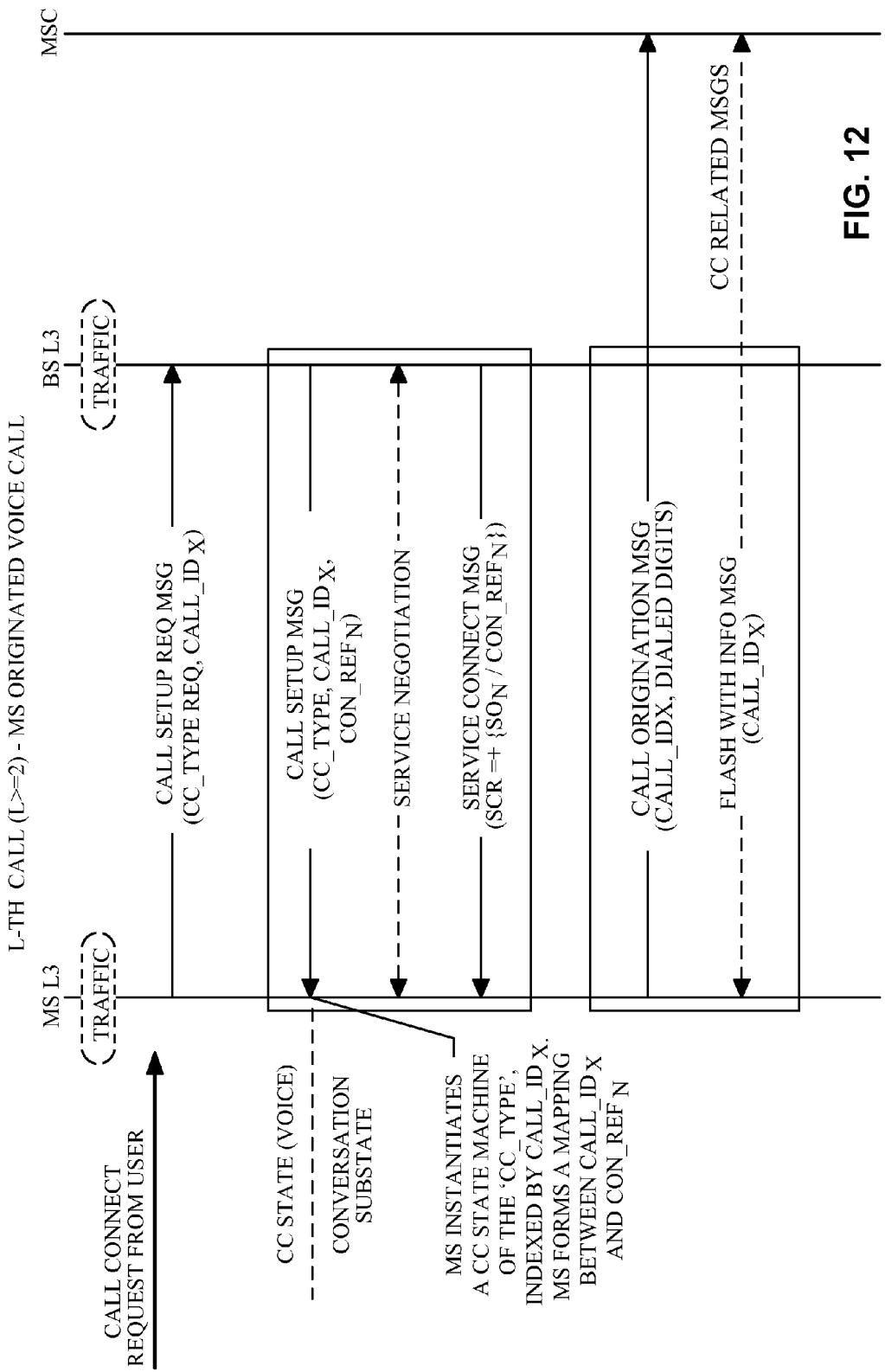

FIG. 12 shows a diagram of the communication between the mobile station and the base station for a subsequent (i.e., $L \geq 2$) call, which is a voice call originated by the mobile station. While in traffic channel substate 524, a call connect request is received from the user. In response, the mobile station sends a Call Setup Request Message that includes, for example, the requested CC type (CC Type Req) and the $CALL\_ID_X$ assigned to this call. In an embodiment, the originator of the call (in this case, the mobile station) is able to assign the CALL_ID to the new call. The mobile station then receives a Call Setup Message that includes the assigned CC Type, the $CALL\_ID_X$, and the $CON\_REF_N$. Upon receiving the Call Setup Message, the mobile station instantiates a CC state machine 530 of the specified (voice) CC Type and indexed by the specified $CALL\_TD_X$. The mobile station performs a mapping between the $CALL\_TD_X$ and the $CON\_REF_N$.

For this new mobile station originated voice call, the mobile station transitions to conversation substate 536 and sends a Call Origination Message that includes, for example, the dialed digits and the $CALL\_TD_X$. The mobile station then performs the service negotiation procedures. In an embodiment, the service negotiation may occur prior to the mobile station sending the Call Origination Message from the conversation substate. The service negotiation messages includes the new service option $SO_N$ and relevant parameters. Upon completion of the service negotiation, the mobile station receives a Service Connect Message with the service configuration record that includes the assigned $SO_N$, $CON\_REF_N$, and relevant parameters. The Flash with Information Messages may be exchanged between the mobile station and the base station, in similar manner as that described above for FIG. 9. Again, messages to this and other calls are identified by the assigned CALL_ID.

Figure 13:
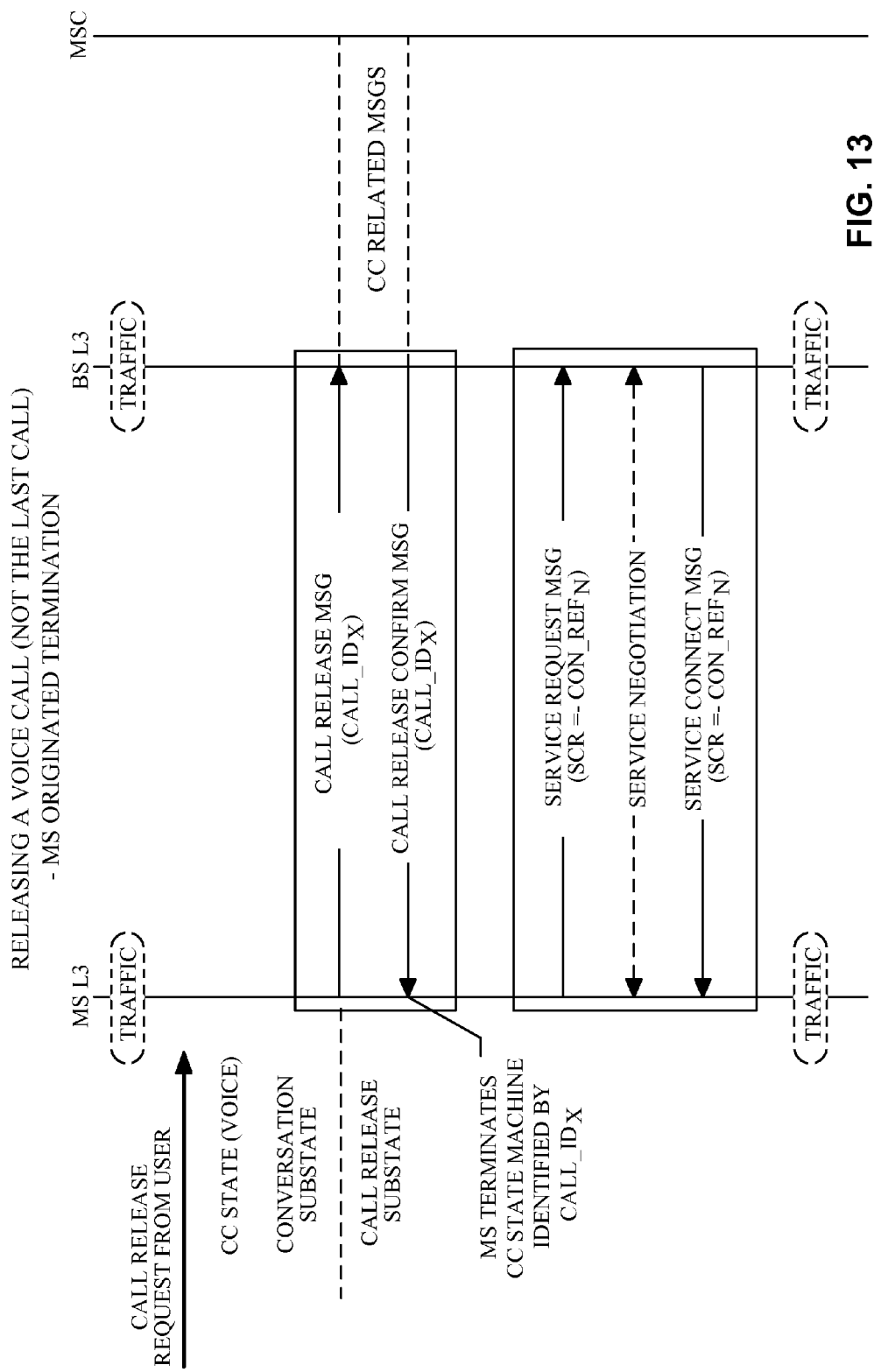

FIG. 13 shows a diagram of the communication between the mobile station and the base station for releasing a voice call (which is not the last call) by the mobile station. While in conversation substate 536 for this call, a Call Release Request is received from the user and, in response, the mobile station enters call release substate 538. The mobile station then sends a call release message that includes the $CALL\_ID_X$ of the call to be released. In response, the mobile station receives a Call Release Confirmation Message that includes the $CALL\_ID_X$. The CC state machine for this voice call is also terminated.

If the release of this call eliminates a service option connection (determined by reviewing the call-to-service option connection mapping), the service negotiation procedures are executed and service option connection related messages are exchanged between the mobile station and the base station. The mobile station transmits a Service Request Message with the service configuration record that includes the $CON\_REF_N$ to be released. At the conclusion of the service negotiation, the mobile station receives a Service Connect Message that includes the $CON\_REF_N$ to be released. Similarly, the physical channel can be released if not needed to support any pending call.

Figure 14:
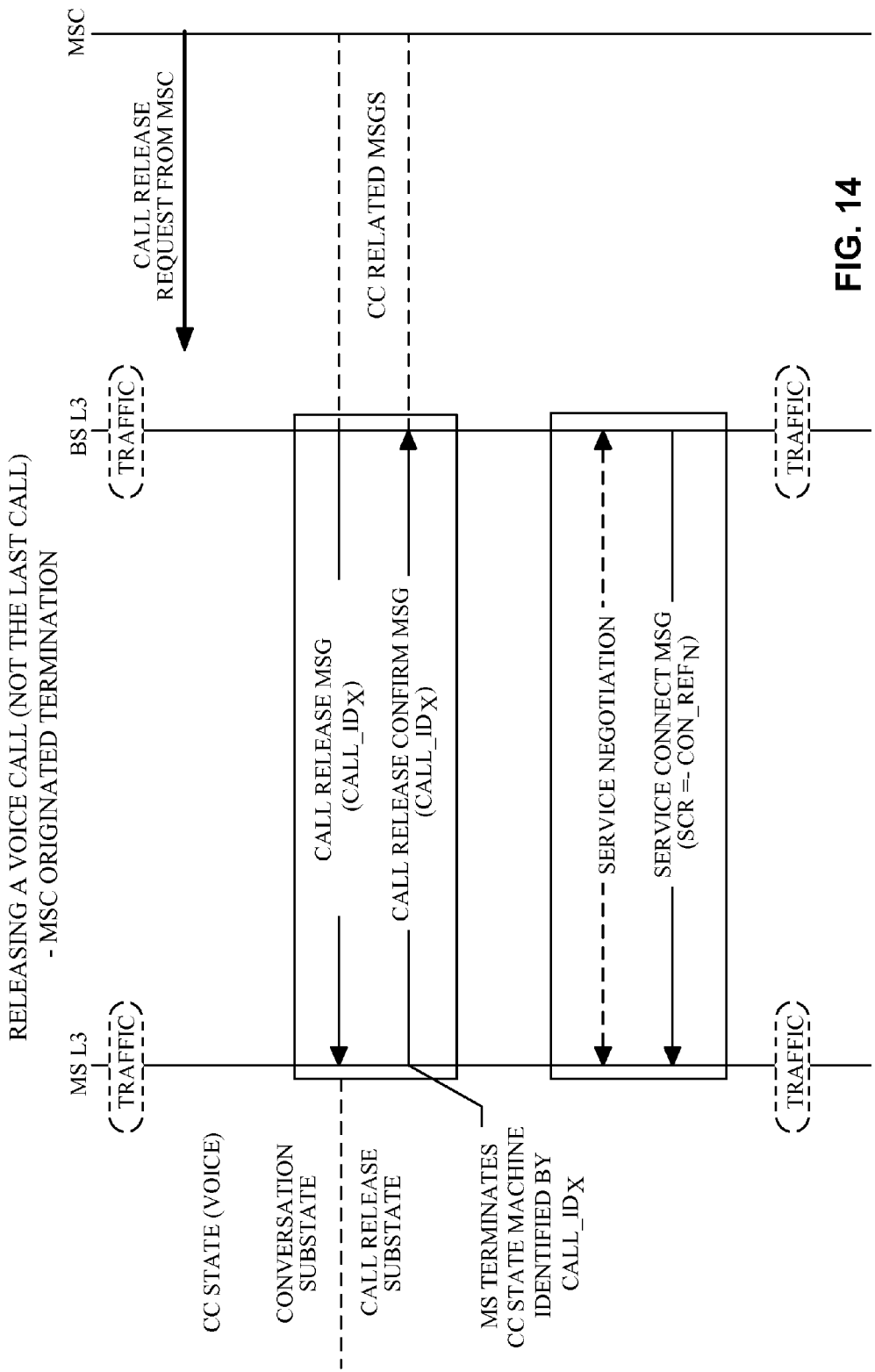

FIG. 14 shows a diagram of the communication between the mobile station and the base station for releasing a voice call (which is not the last call) by the mobile switching center. While in conversation substate 536 for this call, a call release request is received by the base station and, in response, a Call Release Message that includes the $CALL\_TD_X$ of the call to be released is transmitted to the mobile station. Upon receiving the Call Release Message, the mobile station enters call release substate 538. The mobile station then sends a Call Release Confirmation Message that includes the $CALL\_TD_X$ of the call to be released.

If the release of this call eliminates a service option connection, the service negotiation procedures are executed and service option connection related messages are exchanged between the mobile station and the base station. The mobile station receives a Service Request Message with the service configuration record that includes the $CON\_REF_N$ to be released. At the conclusion of the service negotiation, the mobile station receives a Service Connect Message with the service configuration record that includes the $CON\_REF_N$ to be released. Similarly, the physical channel may be released if not needed to support any pending call.

Figure 15:
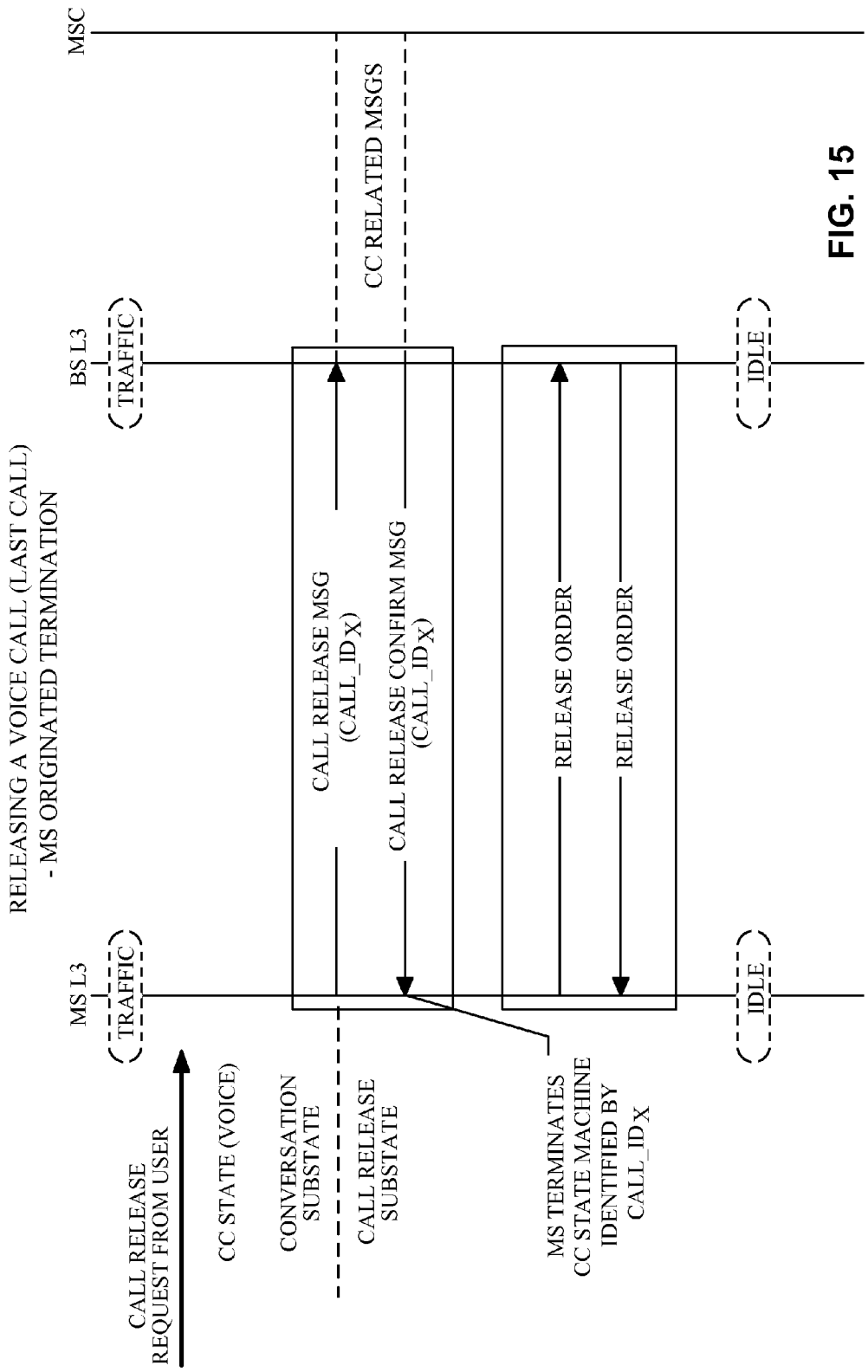

FIG. 15 shows a diagram of the communication between the mobile station and the base station for releasing the last voice call by the mobile station. While in conversation substate 536 for this call, a call release request is received from the user. In response, the mobile station enters call release substate 538 and sends a Call Release Message that includes the CALL_ID$_X$ of the call to be released. The mobile station then receives a Call Release Confirmation Message that includes the CALL_ID$_X$. Since this is the last call, the service option connection and the physical channel for the call can be released via an exchange of radio resource control (RRC) related messages. In particular, the mobile station sends a Release Order. The mobile station then receives a Release Order in response and, thereafter, returns to mobile station idle state 516.

Figure 16:
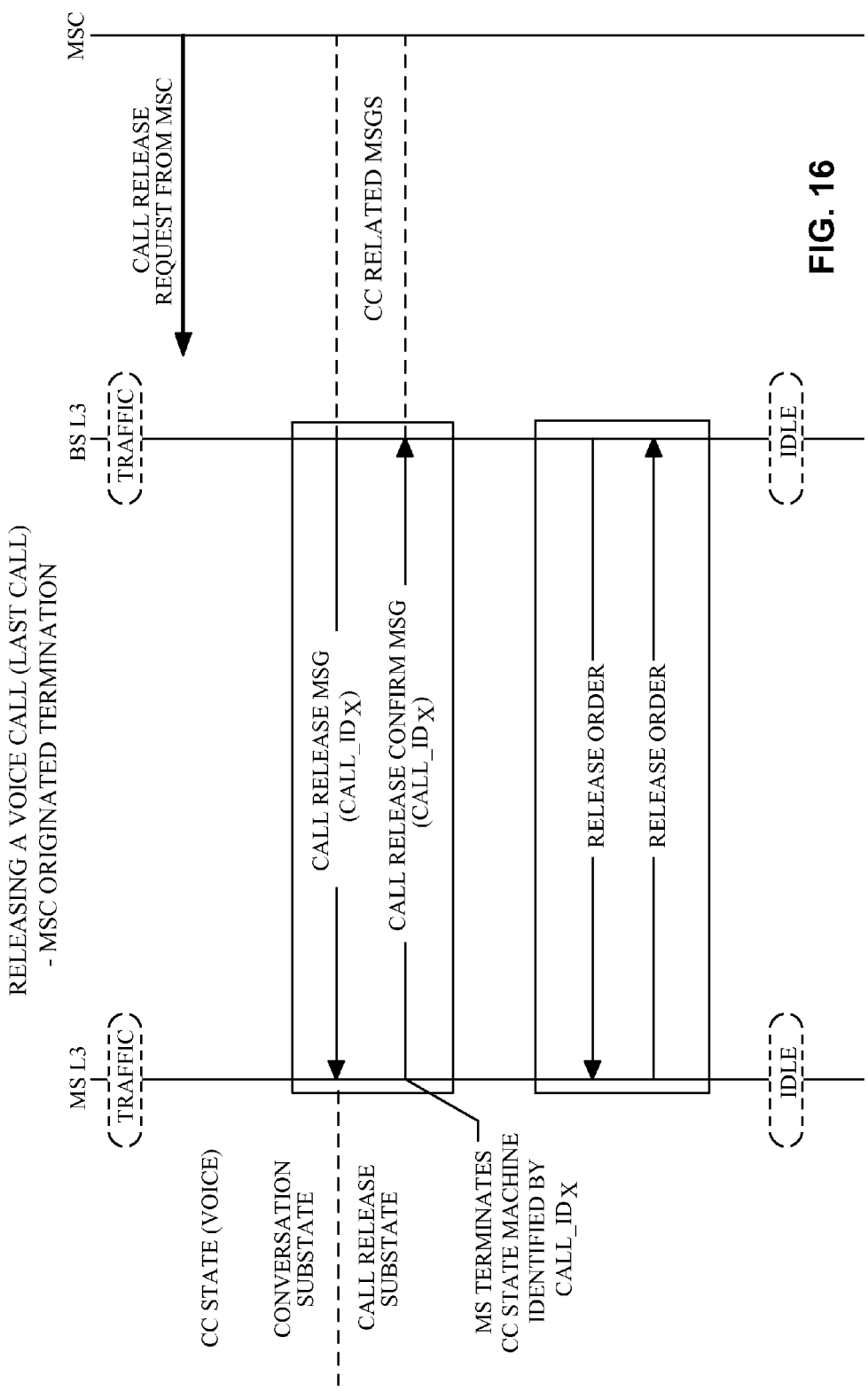

FIG. 16 shows a diagram of the communication between the mobile station and the base station for releasing the last voice call by the mobile switching center. While in conversation substate 536 for this call, a call release request is received by the base station and, in response, a Call Release Message that includes the CALL_ID$_X$ of the call to be released is sent to the mobile station. The mobile station then enters call release substate 538 and sends a Call Release Confirmation Message that includes the CALL_ID$_X$. Since this is the last call, the physical channel used for the call can be released via an exchange of RRC related messages, in a similar manner as that described above for FIG. 15. The mobile station then returns to mobile station idle state 516.

FIGS. 7 through 16 show a set of diagrams that illustrates specific implementations of the call processing by the mobile station and base station in accordance with an aspect of the invention. Different types and combinations of messages can be used to effectuate the call processing, and this is within the scope of the invention.

The elements in the base station and mobile station described above can be implemented in various manners. The receiver and transmitter units of the mobile station and base station can be implemented in one or more integrated circuits, discrete components, or a combination thereof. The controller of the mobile station can be implemented in one or more integrated circuits, an application specific integrated circuit (ASIC), a digital signal processor (DSP), a controller, a microprocessor, other circuits and/or software designed to perform the functions described herein, or a combination thereof. The other elements of the mobile station and base station can be implemented with a combination of hardware and software in a manner known in the art.

The invention described herein can be applied to many spread spectrum communications systems. The invention is applicable to spread spectrum systems that currently exist and new systems that are continually being considered. A specific CDMA system is described in the aforementioned U.S. Pat. No. 6,574,211. Another CDMA system is disclosed in the aforementioned U.S. Pat. Nos. 4,901,307 and 5,103,459.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for processing calls concurrently, comprising:
a controller to receive an indication of a first call to be processed, the controller to determine a first service option connection to be mapped to the first call and to instantiate a first call control state machine of a type in accordance with a type of the first call, the first call control state machine being used to control processing of the first call, and the controller to establish a set of one or more physical channels associated with the first service option connection to be used for data transmission.

2. The apparatus of claim 1 wherein the controller instantiates a separate call control state machine for each subsequent call to be processed, the instantiated call control state machine is of a type in accordance with a type of the respective subsequent call.

3. The apparatus of claim 1 wherein the controller determines, for each subsequent call, a service option connection to be used for data transmission and maps each subsequent call to the respective service option connection.

4. The apparatus of claim 1 wherein, in response to a directive to release a particular call, the controller releases the respective call control state machine associated with the particular call.

5. The apparatus of claim 1 wherein the controller determines whether a particular service option connection is mapped to any active call and releases the particular service option connection if the particular service option connection is not mapped to any active call.

6. An apparatus for processing calls, comprising:
a control processor to implement a call processing state machine including a first state indicative of a period of synchronization with a particular communication system, a second state indicative of a period of monitoring of a paging channel, a third state indicative of a period of accessing a base station in the particular communication system, and a fourth state indicative of processing of at least one active call, each active call being associated with a call control state machine.

7. The apparatus of claim 6 wherein the call control state machine for each call being processed is of a type selected based on a type of the respective call being processed.

8. The apparatus of claim 6 wherein the fourth state includes a first substate indicative of data transmission of traffic channels, a second substate indicative of data transmission for a particular call, and a third substate indicative of termination of the particular call.

9. The apparatus of claim 6 wherein the call control state machine associated with a voice call or a data call includes:
a first substate indicative of a wait for an alert with information message to process the respective;
a second substate indicative of a wait for a user response to the respective call;
a third substate indicative of a period of permissible transmissions for the respective call; and
a fourth substate indicative of termination of the respective call.

* * * * *